US009264857B1

(12) United States Patent
Rinckes et al.

(10) Patent No.: US 9,264,857 B1
(45) Date of Patent: Feb. 16, 2016

(54) COMPACT CODES FOR GEOGRAPHIC LOCATIONS

(71) Applicant: Google Inc., Mountain View, CA (US)

(72) Inventors: Douglas Rinckes, Canton of Zurich (CH); Philipp Bunge, Canton of Bern (CH)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 14/053,793

(22) Filed: Oct. 15, 2013

(51) Int. Cl.
*G01C 21/12* (2006.01)
*G01S 1/08* (2006.01)
*H04W 4/02* (2009.01)

(52) U.S. Cl.
CPC ..................... *H04W 4/025* (2013.01)

(58) Field of Classification Search
USPC .......................................... 701/487; 342/386
See application file for complete search history.

(56) References Cited

U.S. PATENT DOCUMENTS

| | | | | |
|---|---|---|---|---|
| 8,504,401 | B2* | 8/2013 | Sivakkolundhu et al. | ... 705/7.11 |
| 8,650,024 | B1* | 2/2014 | Snellman et al. | ................. 704/9 |
| 8,996,545 | B2* | 3/2015 | Chen et al. | .................... 707/756 |
| 2003/0060970 | A1* | 3/2003 | Edge | ............. 701/200 |
| 2004/0232323 | A1* | 11/2004 | Bosco et al. | .................. 250/253 |
| 2006/0161346 | A1* | 7/2006 | Murakami et al. | ........... 701/213 |
| 2009/0088183 | A1* | 4/2009 | Piersol et al. | .............. 455/456.1 |
| 2010/0125409 | A1* | 5/2010 | Prehofer | ........................ 701/207 |
| 2010/0289675 | A1* | 11/2010 | Ueda | ................................ 341/83 |
| 2011/0161334 | A1* | 6/2011 | Sivakkolundhu et al. | ..... 707/758 |
| 2011/0208427 | A1* | 8/2011 | Jansen et al. | .................. 701/208 |
| 2012/0162013 | A1* | 6/2012 | Piersol et al. | ................. 342/386 |

OTHER PUBLICATIONS

"Military Grid Reference System", Wikipedia, The Free Encyclopedia, Wikimedia Foundation, Inc., 3 pages.
"Natural Area Code", Wikipedia, The Free Encyclopedia, Wikimedia Foundation, Inc., 2 pages.
"Universal Transverse Mercator Coordinate System", Wikipedia, The Free Encyclopedia, Wikimedia Foundation, Inc., 7 pages.
"Use the Global Postal Code System Now", http://globalpostalcodesystem.info, 3 pages.

* cited by examiner

*Primary Examiner* — Thomas G Black
*Assistant Examiner* — Tyler Paige
(74) *Attorney, Agent, or Firm* — Dority & Manning, P.A.

(57) ABSTRACT

Systems and methods for generating a compact code that accurately identifies the position of a point on the Earth or other body are provided. The compact code can signify the position of a place in a manner that is easy to remember, easy to use, and in a way that allows a person to find the location without having to depend on local directions. The compact code can be generated independent of house numbers, street names, zip codes, local character sets and other current addressing tools. The compact code can be used for a variety of applications. For instance, the compact code can be associated with points of interest in a geographic information system, can be used to geolocate information, and/or can be used to navigate to a particular geographic location.

17 Claims, 13 Drawing Sheets

| CHARACTER SET: | 2 | 3 | 5 | 6 | 7 | 8 | 9 | B | D | F | G | H | J | M | P | Q | W | X | Y | Z |
|---|---|---|---|---|---|---|---|---|---|---|---|---|---|---|---|---|---|---|---|---|
| BASE 20: | 0 | 1 | 2 | 3 | 4 | 5 | 6 | 7 | 8 | 9 | 10 | 11 | 12 | 13 | 14 | 15 | 16 | 17 | 18 | 19 |

COMPACT CODES FOR GEOGRAPHIC LOCATIONS

FIELD

The present disclosure relates generally to providing compact encoding of geographic locations.

BACKGROUND

Geographic information systems provide for the archiving, retrieving, and manipulating of data that has been stored and indexed according to geographic coordinates of its elements. A geographic information system generally includes a variety of data types, including imagery, maps, tables, vector data (e.g. vector representations of roads, parcels, buildings, etc.), three-dimensional models, and other data. Improvements in computer processing power and broadband technology have led to the development of interactive geographic information systems that allow for the navigating and displaying of geographic imagery, such as map imagery, satellite imagery, aerial imagery, street level imagery, three-dimensional models, and other geographic imagery. Users can use a geographic information system to search for, view, receive travel directions to, and otherwise navigate a particular point of interest.

Many areas have poor address systems due to missing or unknown street names, duplicate names, and other problems. Some areas identify locations using relative addressing, such as "near the old bus stop." In areas where postal codes do exist, the postal codes can represent large areas useful for finding an approximate location, but cannot identify the position a specific point of interest (e.g. the door of a house). Street addresses can be suitable for identifying the location of points of interests on named roads. However, points of interest away from named roads can be much more difficult to identify.

The position of a point of interest can be identified using geographic coordinates such as latitude and longitude coordinates. However, latitude and longitude coordinates can be quite long and easily confused. Moreover, many individuals do not understand how to use latitude and longitude coordinates to identify a position. Other systems for identifying the position of a point of interest include the Global Postal Code System/Natural Area Coding System and the Universal Transverse Mercator and the Military Grid Reference System. These systems, however, do not provide for the simple truncation of codes such that latitude and longitude degrade gracefully when identifying a geographic location with more or less specificity.

SUMMARY

Aspects and advantages of embodiments of the present disclosure will be set forth in part in the following description, or may be obvious from the description, or may be learned through practice of the embodiments.

One aspect of the present disclosure is directed to a computer-implemented method for providing a compact code for a geographic location. The computer-implemented method includes accessing, by one or more computing devices, a position coordinate for the geographic location. The position coordinate includes a latitude coordinate and a longitude coordinate. The method can further include converting, by the one or more computing devices, the latitude coordinate to a first character string using a base conversion. The first character string has fewer characters than the latitude coordinate. The method can further include converting, by the one or more computing devices, the longitude coordinate to a second character string using the base conversion. The second character string has fewer characters than the longitude coordinate. The method can further include interleaving, by the one or more computing devices, the first character string and the second character string to generate a compact code for the geographic location.

Other aspects of the present disclosure are directed to systems, apparatus, tangible, non-transitory computer-readable media, user interfaces and devices for providing and/or decoding a compact code for a geographic location.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
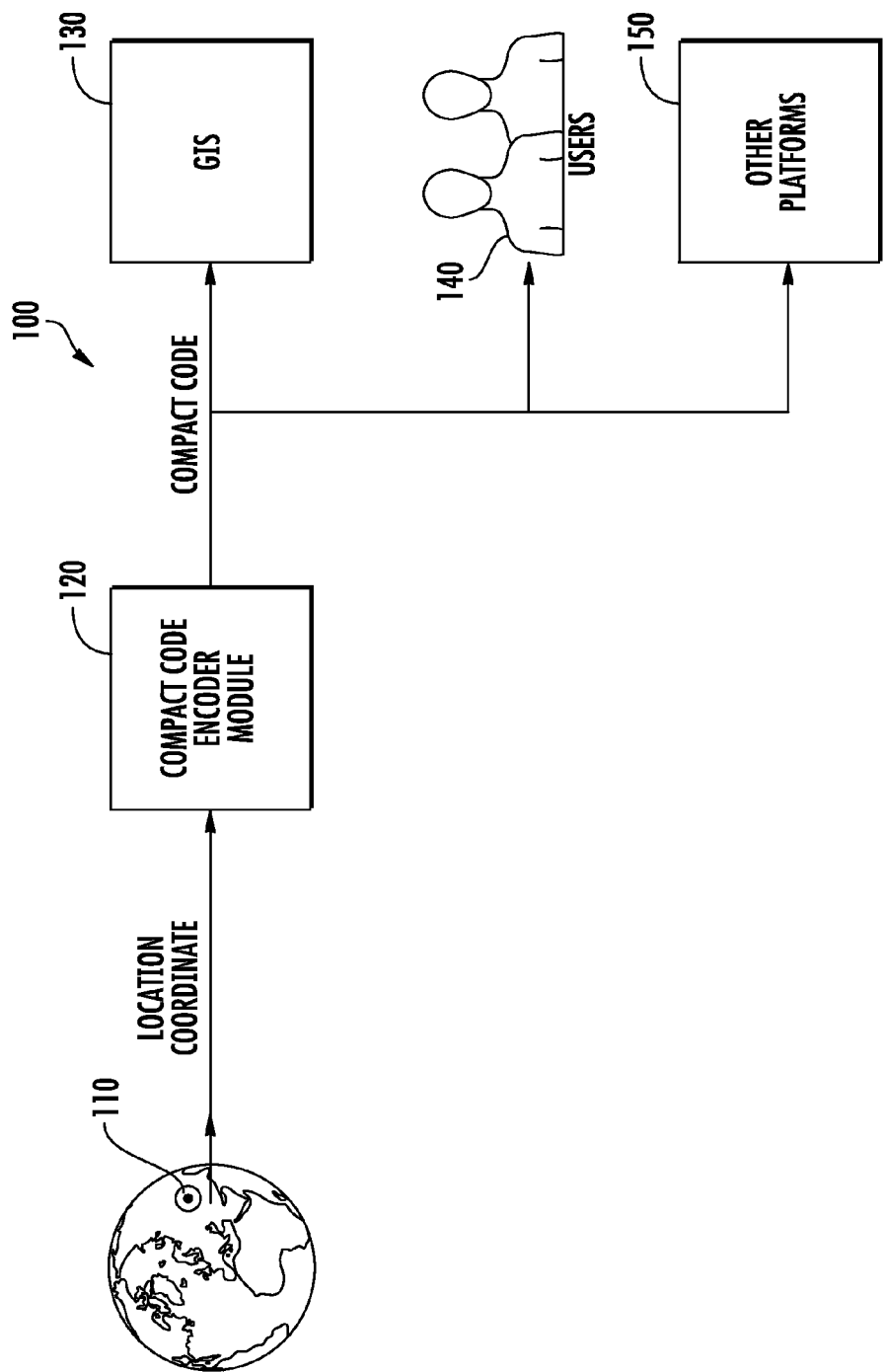
FIG. 1 depicts an overview of a system for providing a compact code for a geographic location according to an embodiment of the present disclosure.

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to systems and methods for providing a compact code that accurately identifies the position of a point on the Earth or other body (e.g., a moon, a planet, etc.). The compact code can signify the position of a place in a manner that is easy to remember, is easy to use, and in a way that allows a person to find the location without having to depend on local directions. The compact code can be generated independent of house numbers, street names, zip codes, local character sets and other current addressing tools. The compact code can represent an area. The size of the area represented by the compact code can be indicated by the length of the compact code. Therefore, locations that do not have a high accuracy can be expressed with a shorter compact code. Locations that need to be extremely accurate can be expressed with a longer compact code According to particular aspects of the present disclosure, the compact code can be generated for a geographic location by accessing the latitude and longitude coordinates associated with the geographic location. The latitude and longitude coordinates can be corrected to positive ranges and can be converted to a different number base using a base conversion. The base conversion condenses the latitude and longitude coordinates into fewer characters. For instance, in a particular implementation, the latitude and longitude coordinates can be converted to base 20 numbers. Converting to base 20 allows the same values to be expressed with fewer characters.

In example implementations, the latitude and longitude coordinates can be further encoded into respective latitude and longitude character strings using a disambiguated character set such that the character strings do not include characters that can form easily recognizable words and/or confusing characters. For instance, the base conversion can encode the latitude and longitude coordinates into character strings using a character set that does not include vowel characters (e.g. "A", "E", "I", "O", "U", "Y") or characters with the appearance of vowels ("0", "1", "4"). As another example, the base conversion can encode the latitude and longitude coordinates using a character set that eliminates easily confused characters (e.g. "S"/"5", and "P"/"R"). As another example, the character set can further eliminate characters to avoid recognizable abbreviations of words ("C", "K", "L", "N", "S" and "T").

Once the latitude and longitude coordinates have been encoded into respective latitude and longitude character strings, the compact code can be generated by interleaving the characters (e.g. alternating characters) in the respective latitude and longitude character strings to generate a single character string that alternates latitude and longitude characters. By convention, a character associated with the encoded latitude character string can be used as the first character in the compact code. Spacers can be added in the compact code (e.g. after four characters) to break the compact code up and make it easier to remember.

As an example, a geographic location can have a position coordinate associated with latitude and longitude coordinates as follows: 47.365561, 8.52494. The latitude and longitude coordinates can be corrected to positive ranges by adding 90 to the latitude coordinate and 180 to the longitude coordinate, yielding the following coordinates: 137.365561, 188.524942. The coordinates can be converted to base 20 coordinates using a base 20 conversion as follows, and restricting the latitude and longitude to five characters each: 6H764, 98A9J. The base conversion can represent these base 20 coordinates using the character set 2, 3, 5, 6, 7, 8, 9, B, C, D, F, G, H, J, K, L, M, N, P, Q, R, S, T, W, X, Y, Z. This generates latitude and longitude character strings as follows: 9XB97, FDGFZ. The compact code is generated by interleaving the latitude and longitude character strings, and inserting a spacer after the first four characters as follows: 9FXD.BG9F7Z.

A compact code represents an area, sufficient to contain all other codes that have the compact code as a prefix. The height of the area represented by a compact code is given by 1 divided by the number base used to the power of the length of the latitude character string minus two. The width of a code is given by 1 divided by the number base to the power of the longitude character string minus two. For example, the latitude character string 9XB97 has five characters, so represents an area that is $1/20^3=1/8000=0.000125$ degrees in height. The longitude character string FDGFZ also has five characters, and so the area width is 0.000125 degrees.

A compact code according to aspects of the present disclosure can include any number of characters, such as up to 14 characters. The specificity of the position identified by the compact code can depend on the number of characters that are specified in the compact code. For instance, a compact code of two characters can specify a large geographic area (e.g. Central Europe), while a compact code of 14 characters can specify approximately a 3 cm×3 cm geographic area. Interleaving the latitude and longitude coordinates in the compact code allows for both latitude and longitude to expand or degrade together when lengthening or shortening the compact code.

According to particular example aspects of the present disclosure, 10 characters can be used in the compact code. A 10 character compact code can provide accuracy of ±6 meters. A spacer can be added after four characters in the compact code to facilitate use of the compact code. In certain implementations, portions of the compact code can be omitted by providing context. For instance, BG9F7Z, Zurich can be equivalent to 9FXD.BG9F7Z, because this is the nearest matching code to the city of Zurich. Detail can be omitted to identify a general area. For instance, 9FXD.BG can identify West Zurich.

Similar compact code can be indicative of proximity of the geographic locations represented by the compact codes. Moreover, the spatial relationship between geographic locations can be determined from the compact codes. For example, 9FXD.BGDF7Z is located just to the north of 9FXD.BG9F7Z and very far from 5XGW.FXJFHD.

The compact code can be used for a variety of applications. In one example, the compact code can be used to identify the positions of points of interest in a geographic information system. For instance, the geographic information system can display the compact code of a point of interest in conjunction with geographic imagery of the point of interest. A user can also search for or request travel directions to a particular geographic area by inputting the compact code into a suitable user interface. The geographic information system can be configured to progressively zoom the geographic imagery to progressively smaller geographic areas as the user inputs the compact code.

In another example, a user can perform a function (e.g. capture an image) or run an application (e.g. a mapping service) on a mobile device, such as a smartphone, tablet, or wearable computing device. A positioning system, such as a GPS system, can be used to determine latitude and longitude coordinates associated with information (e.g. a photograph). The mobile device can be configured to convert the latitude and longitude coordinates to a compact code and to communicate the information and associated compact code to a geographic information system. The geographic information system can then geolocate the information based on the compact code.

In yet another example, a user can receive a compact code of a point of interest, for instance, from a geographic information system or other system. For instance, a delivery service can receive a compact code for a particular geographic location to deliver a package. A computing device, such as a smartphone, tablet, or other computing device, can decode the compact code into a geographic location. A navigation system can guide the delivery service to the particular geographic location using, for instance, a positioning system.

In situations in which the systems and methods discussed herein access and analyze personal information about users, or make use of personal information, such as position information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example System for Providing a Compact Code

FIG. 1 depicts an overview of an example system 100 for providing a compact code according to an embodiment of the present disclosure. The system 100 can include a compact code encoder module 120 that can be implemented using one or more computing devices, such one or more of the computing devices depicted in FIG. 9. The compact code encoder module 120 of FIG. 1 can access a position coordinate of a geographic location 110 on the Earth or other body (e.g., a moon, a planet, etc.). The position coordinate can include latitude and longitude coordinates associated with the geographic location. The position coordinate of the geographic location 110 can be accessed from a database of position coordinates, for instance, in a geographic information system, or can be determined using a positioning system, such as a GPS system.

Once the position coordinate of the geographic location 110 has been accessed, the compact code encoder module 120 can encode the position coordinate into a compact code. One example method that can be implemented by the compact code encoder module 120 for encoding the position coordinate into a compact code will be discussed with reference to FIG. 2.

The compact code generated by the compact code encoder module 120 of FIG. 1 can have characteristics that make it particularly suitable for identifying the positions of geographic locations. For instance, the compact code generated by the compact code encoder module 120 can represent positions of geographic locations with accuracy equal to that of latitude and longitude coordinates with fewer characters than latitude and longitude coordinates. The compact code can also avoid characters that are easily confused. The compact code can be easily lengthened or shortened such that both latitude and longitude associated with the compact code degrade or expand nearly equally. Compact codes generated by the compact code encoder module 120 can also provide an indication of proximity of geographic locations based on similarity. For instance, similar compact codes can represent geographic locations that are close together.

As illustrated in FIG. 1, the compact code generated by the compact code encoder module 120 can be provided to a geographic information system 130. The geographic information system 130 can use the compact code for a variety of purposes, such as for associating a point of interest with the compact code in the geographic information system. The compact code can also be provided to various users 140 for use in identifying the position of geographic location. The compact code can further be provided to other platforms 150 (e.g. a delivery service platform, a geolocation platform, etc.) for use in identifying the position of a geographic location.

The generation of the compact codes by the compact code encoder module 120 can be performed using a simple algorithm that can be performed off-line. For example, in one embodiment, a mobile device (e.g. a smartphone, tablet, wireless device, wearable computing device, or other mobile device) can implement an application that obtains the position coordinate of a geographic location using a positioning system, such as a GPS system. The application can convert the position coordinate into a compact code without requiring a network connection to a remote computing device (e.g. a server associated with a geographic information system). The compact code of the geographic location can be stored in a local memory on the mobile device and can be communicated to a remote computing device when a network connection is established.

Figure 2:
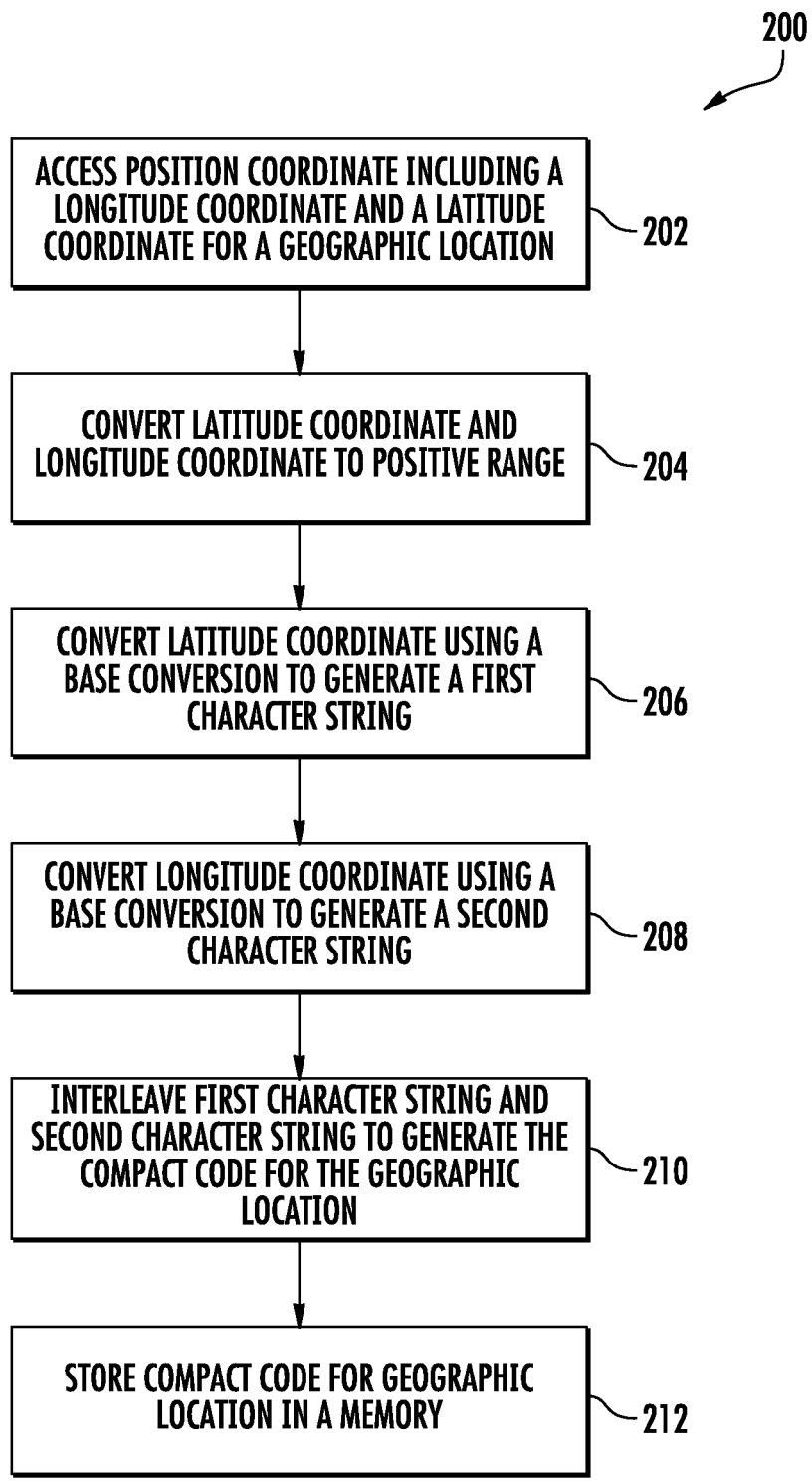
FIG. 2 depicts a flow diagram of a method for providing a compact code for a geographic location according to an embodiment of the present disclosure.

Method for Providing a Compact Code According to an Embodiment of the Present Disclosure FIG. 2 depicts a flow diagram of a method (200) for providing a compact code according to an embodiment of the present disclosure. The method (200) can be implemented by one or more computing devices, such as one or more of the computing devices depicted in FIG. 9. In addition, FIG. 2 depicts steps performed in a particular order for purposes of illustration and discussion. Those of ordinary skill in the art, using the disclosures provided herein, will understand that various steps of any of the methods discussed herein can be omitted, rearranged, combined and/or adapted in various ways.

At (202), the method can include accessing a position coordinate for a geographic location. The position coordinate can include latitude and longitude coordinates for a geographic area. The position coordinate for the geographic location can be accessed in any suitable manner. For instance, a position coordinate associated with the geographic location stored in a memory can be accessed for determining a compact code. The position coordinate can also be accessed by determining the position coordinate of a geographic location using a positioning system, such as a GPS system.

At (204), the latitude coordinate and the longitude coordinate can be converted to a positive range. Latitude coordinates can span the range of −90° to 90°. The latitude coordinate can be converted to a positive range (e.g. 0° to 180°) by adding 90° to the latitude coordinate. For example, a latitude coordinate of −45° can be converted to 45°. Longitude coordinates can span the range of −180° to 180°. The longitude coordinate can be converted to a positive range (e.g. 0° to 360°) by adding 180° to the longitude coordinate. For example, a longitude coordinate of −40° can be converted to 140°.

At (206), the method can include converting the latitude coordinate to a first character string using a base conversion. The base conversion converts the number base of the latitude coordinate to a different number base. In this way, the latitude of the geographic location can be represented using fewer characters than the latitude coordinate. The base conversion can convert the latitude coordinate to any suitable number base that reduces the number of characters of the latitude coordinate. For instance, the base conversion can convert the latitude coordinate to a number base in the range of base 11 to base 25. In one particular implementation, the base conversion can convert the latitude coordinate to a base 20 number base. A base 20 number base can reduce the number of characters necessary to represent the latitude coordinate.

In a particular implementation, the base conversion can encode the latitude coordinate using a disambiguated character set. A disambiguated character set is a character set that reduces the ability of recognizable words to be formed in the compact code. For instance, the disambiguated character set can omit vowel characters. The disambiguated character set can also omit one or more easily confused characters.

Figures 3, 4:
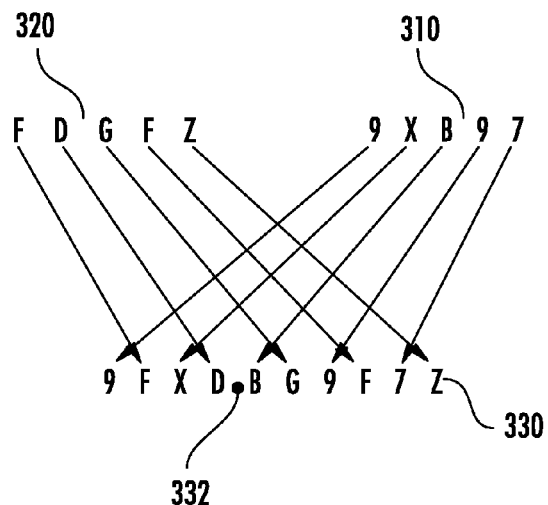
FIG. 3 depicts an example disambiguated character set according to an embodiment of the present disclosure.
FIG. 4 depicts an example of interleaving character strings associated with the latitude coordinates and longitude coordinates to generate a compact code according to an embodiment of the present disclosure.

FIG. 3 depicts a character set 300 that can be used to encode latitude and longitude coordinates according to an embodiment of the present disclosure. The character set includes the characters: 2, 3, 5, 6, 7, 8, 9, B, D, F, G, H, J, M, P, Q, W, X, Y, Z. Each coordinate, once converted to base 20, can be encoded using the character set. For instance, a base 20 digit of 0 can be encoded as a 2. A base 20 digit of 1 can be encoded as a 3, and so forth. FIG. 3 depicts one example disambiguated character set 300 that can be used in accordance with aspects of the present disclosure. Those of ordinary skill in the art, using the disclosures provided herein, will understand that other suitable character sets can be used without deviating from the scope of the present disclosure.

Referring back to FIG. 2 at (208), the method can include converting the longitude coordinate to a second character string using the base conversion. The base conversion converts the number base of the longitude coordinate to a different number base. In this way, the longitude of the geographic location can be represented using fewer characters than the longitude coordinate. The base conversion can convert the longitude coordinate to any suitable number base that reduces the number of characters of the longitude coordinate. For instance, the base conversion can convert the longitude coordinate to a number base in the range of base 11 to base 25. In one particular implementation, the base conversion can convert the longitude coordinate to a base 20 number base. A base 20 number base can reduce the number of characters necessary to represent the longitude coordinate.

The base conversion can encode the longitude coordinate using a disambiguated character set. For instance, the disambiguated character set can omit vowel characters. The disambiguated character set can also omit one or more easily confused characters. In one implementation, the base conversion can encode the longitude coordinate using the character set 300 depicted in FIG. 3. Those of ordinary skill in the art, using the disclosures provided herein, will understand that other suitable character sets can be used without deviating from the scope of the present disclosure.

Once the latitude coordinate has been converted to the first character string and the longitude coordinate has been converted to the second character string, the method can include interleaving the first character string and the second character string to generate the compact code for the geographic location as shown at (208) of FIG. 2. Interleaving the first character string and the second character string includes alternating characters associated with the first character string and the second character string as characters in the compact code.

FIG. 4 depicts an example of interleaving the character strings associated with the latitude and longitude coordinates to generate a compact code according to an embodiment of the present disclosure. In particular, a latitude coordinate has been converted using a base conversion and character set to a first character string 310. The example first character string 310 is 9XB97. A longitude coordinate has been converted using a base conversion and character set to a second character string 320. The second character string 320 is FDGFZ. The first character string 310 and the second character string 320 are interleaved to form the compact code 330.

In particular, the first character of the compact code 330 can be the first character "9" from the first character string 310. The second character of the compact code 330 can be the first character "F" from the second character string 320. The third character of the compact code 330 can be the second character "X" from the first character string 310. The fourth character of the compact code 330 can be the second character "D" from the second character string 320, and so forth. The first character of the compact code 330 can be associated with the first character string 310 generated from the latitude coordinate. Spacer 332 can be added to facilitate recognition and use of the compact code 330.

The compact code can include any suitable number of characters, such as 3 to 14 characters. Interleaving the character strings to generate the compact code provides for the graceful degradation or expansion of latitude and longitude in the compact code. In particular, lengthening or shortening the compact code affects both latitudinal and longitudinal extent of the geographic location represented by the compact code. The specificity of the position identified by the compact code can depend on the number of characters that are specified by a compact code. For instance, a compact code of two characters can specify a large geographic area (e.g. Central Europe), while a compact code of 14 characters can specify a very precise geographic location (e.g. 3 cm×3 cm geographic location).

The degradation or expansion of latitude and longitude during shortening or lengthening of the compact code according to an embodiment of the present disclosure is depicted in FIGS. 5(a)-5(f). In particular, FIGS. 5(a)-5(f) depict a display 410 associated with a computing device that presents geographic imagery 420 of a geographic location, including imagery associated with point of interest. The geographic imagery 420 can be presented on the display 410 by a mapping application implemented as part of a geographic information system. An example geographic information system will be discussed in more detail below with reference to FIG. 6.

Figure 5A:
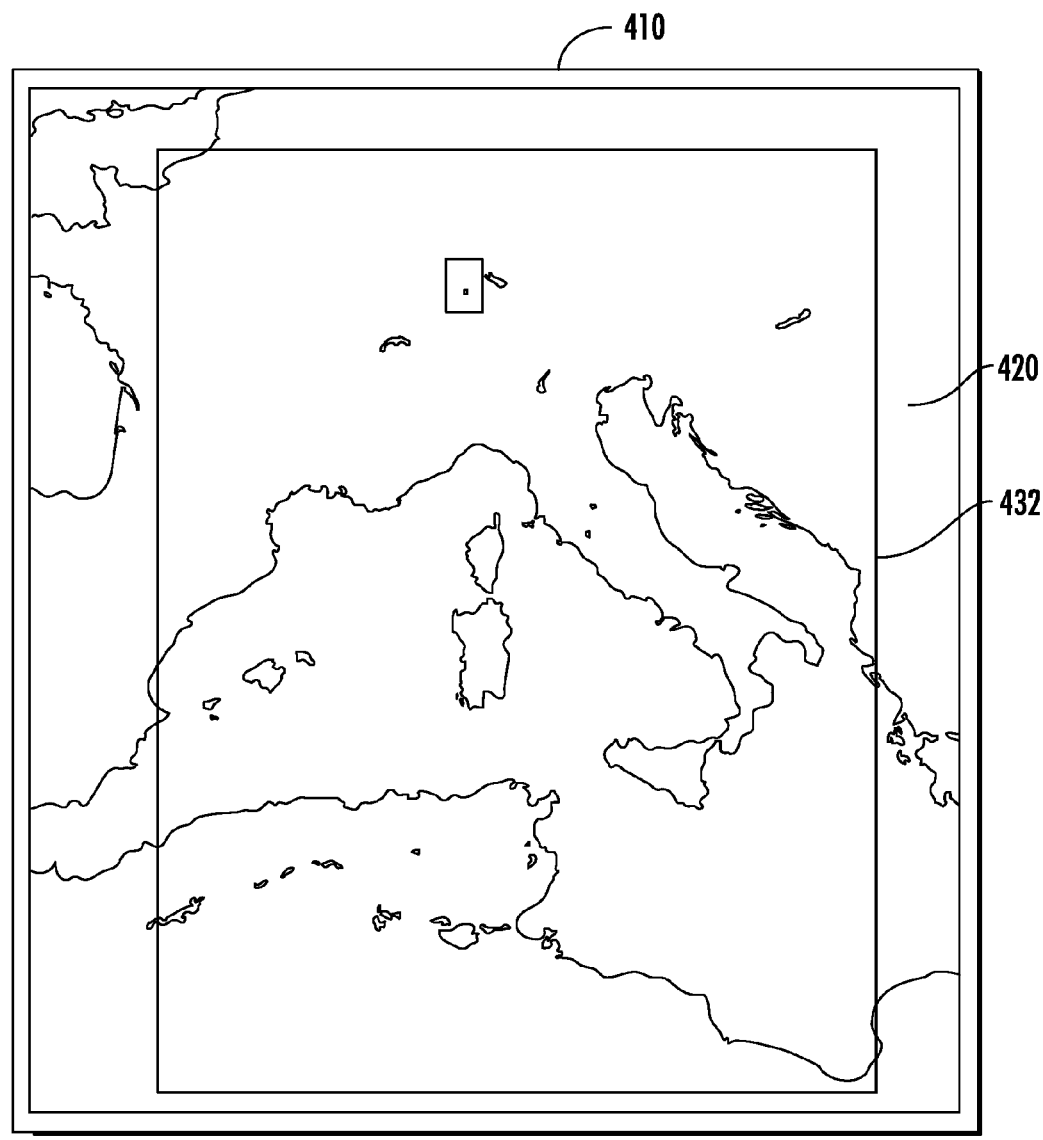
FIGS. 5(*a*)-5(*f*) depict the degradation of latitude and longitude of an example compact code during shortening and/or lengthening of the compact code according to an embodiment of the present disclosure.

FIG. 5(a) depicts geographic imagery 420 associated with a point of interest for a compact code consisting of the two characters 9F. The two character compact code is representative of an area 1926 km×2226 km area 432. The two character compact code can be generally associated with Southern Europe.

Figure 5B:
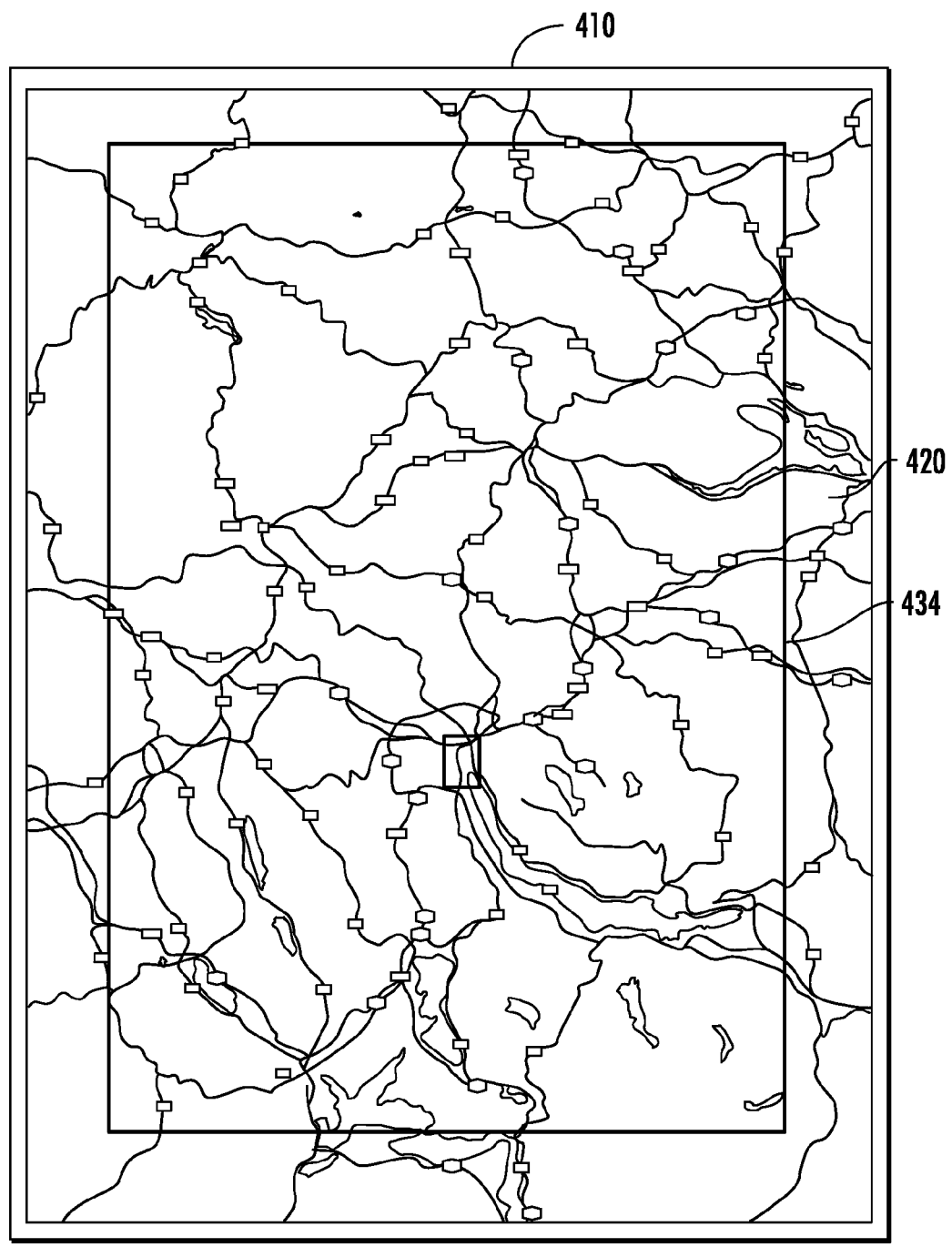

FIG. 5(b) depicts geographic imagery 420 associated with a point of interest for a compact code including four characters: 9FXD. The four character compact code can be representative of a 76 km×111 km area 434. The four character compact code can be generally associated with North Switzerland.

Figure 5C:
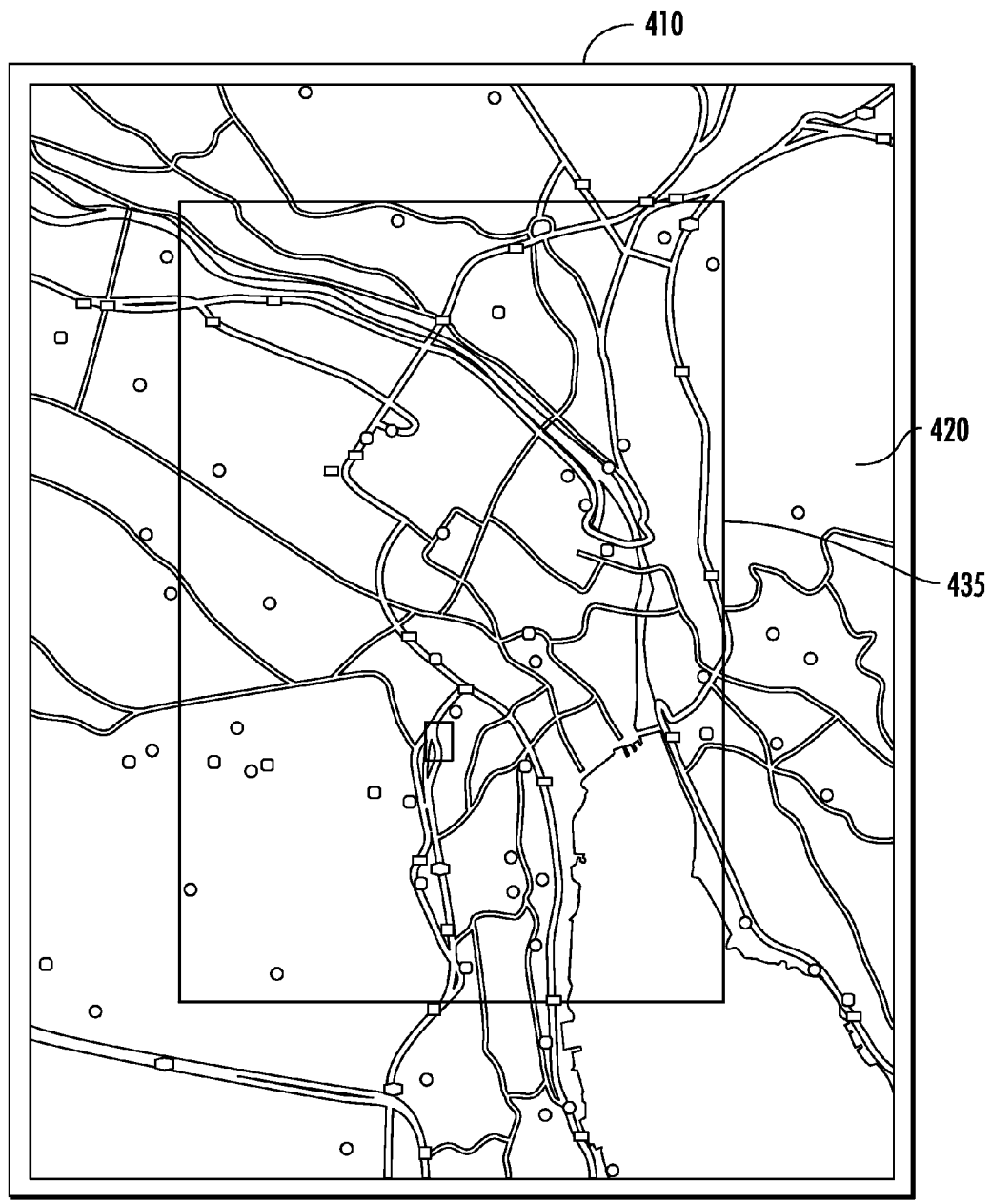
Figure 5D:
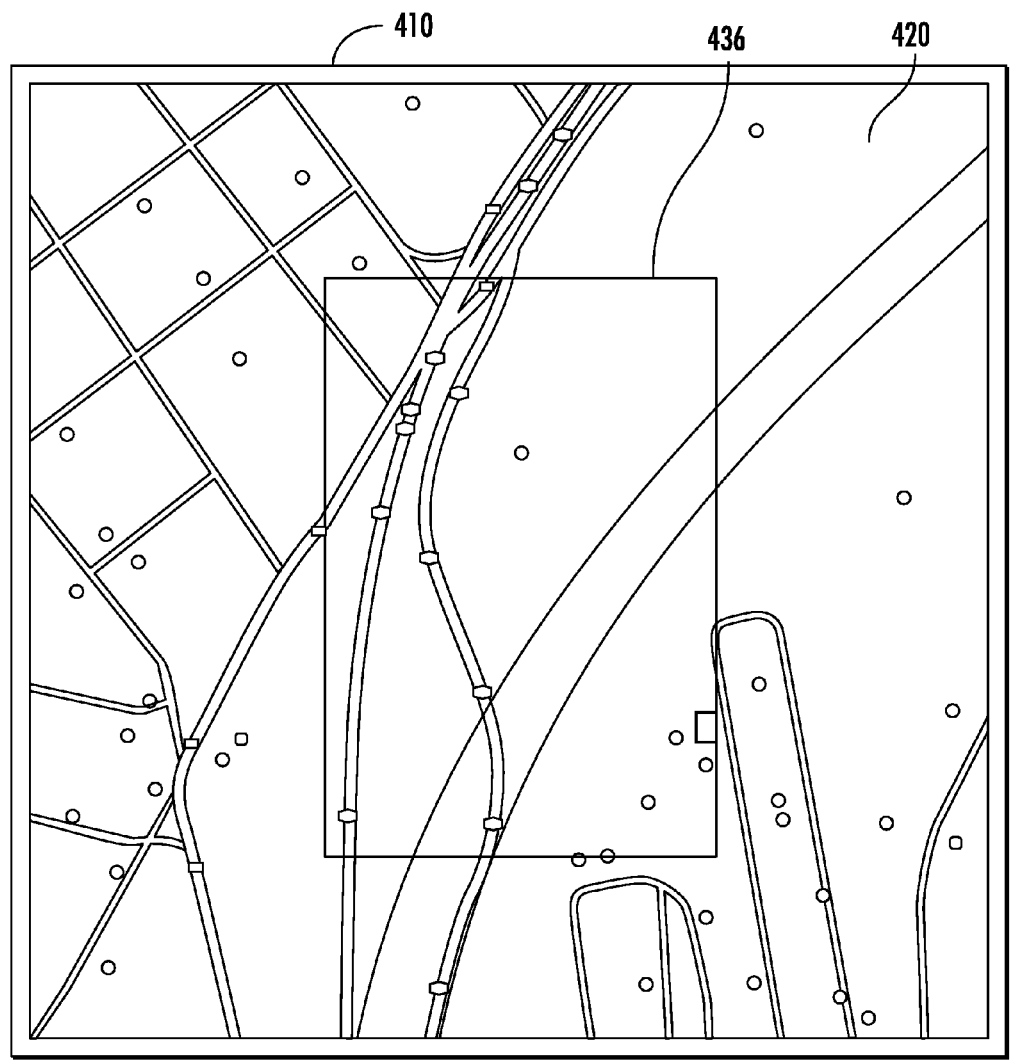
Figure 5E:
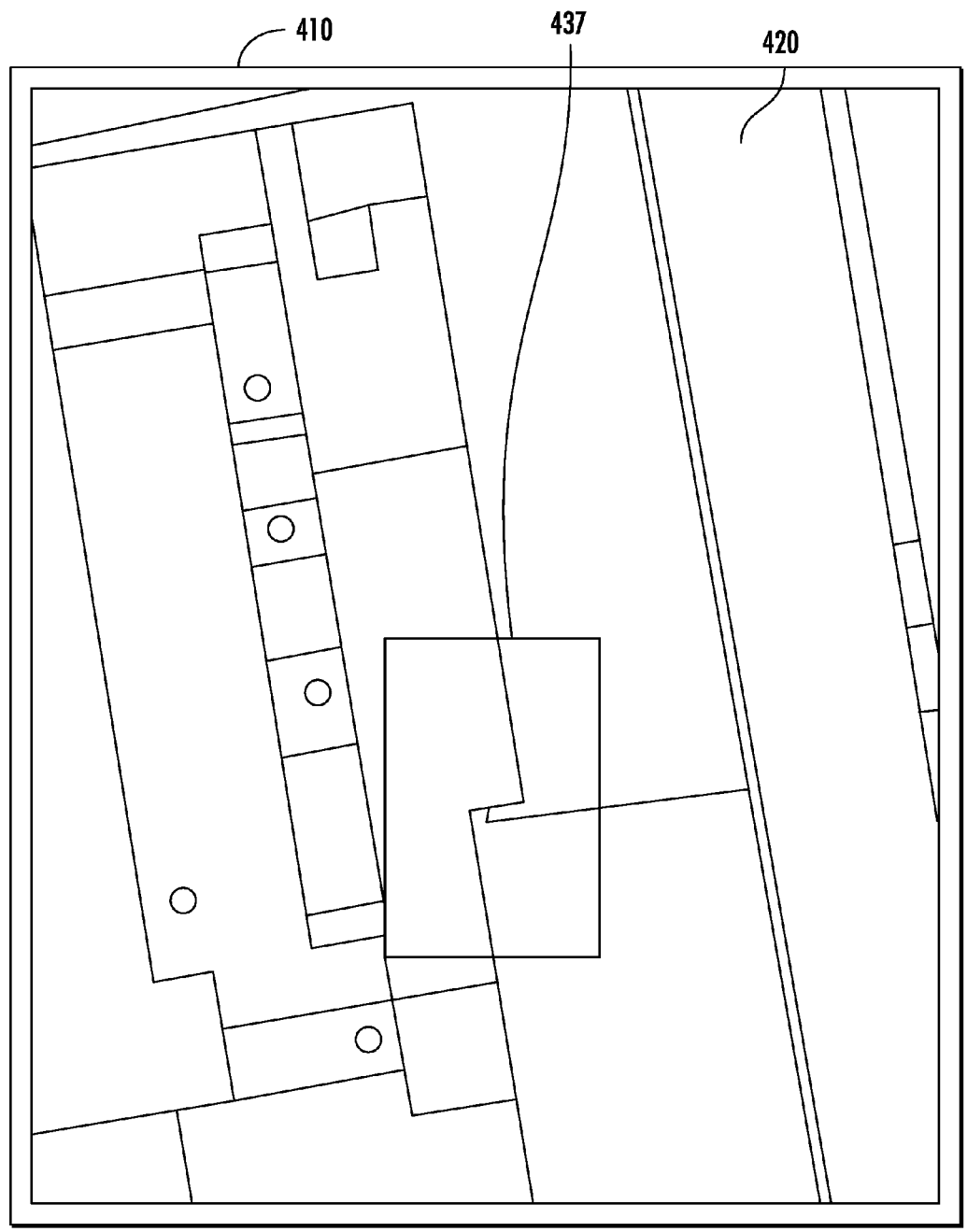
Figure 5F:

FIG. 5(c) depicts geographic imagery 420 associated with a point of interest for a compact code including six characters: 9FXD.BG. The six character compact code can be representative of a 3.8 km×5.6 km area 435. The six character compact code can be generally associated with Central Zurich.

FIG. 5(*d*) depicts geographic imagery 420 associated with a point of interest for a compact code including eight characters: 9FXD.BG9F. The eight character compact code can be representative of a 188 m×278 m area 436. The eight character compact code can be generally associated with a particular neighborhood in Central Zurich.

FIG. 5(*e*) depicts geographic imagery 420 associated with a point of interest for a compact code including ten characters: 9FXD.BG9F7Z. The ten character compact code can be representative of a 9 m×14 m area 437. The ten character compact code can be associated with the point of interest. For instance, the ten character compact code can be representative of the reception area at the point of interest.

The compact code can be extended to more characters to define position with greater precision. For instance, the compact code can include twelve characters: 9FXD.BG9F7ZFG. The twelve character compact code can be representative of a 0.5 m×0.7 m area. As another example, the compact code can include fourteen characters: 9FXD.BG9F7ZFGQD. The fourteen character compact code can be indicative of a 2 cm×3 cm area.

FIG. 5(*f*) depicts geographic imagery 420 associated with a compact code including seven characters: 9FXD.BG9. This code decomposes into two strings of unequal length, 9XB9 and FDG. The longer code defines the latitude and the shorter code the longitude. The resulting area 439 is approximately 20 times wider than it is high, and this is true of all compact code codes with an odd number of characters.

Referring back to FIG. 2 at (212), the method includes storing the compact code in a memory. For instance, the compact code can be associated with a geographic location in a geographic information system. Once the compact code has been stored in a memory, the compact code can be used for a variety of applications, such as identifying the locations of points of interest in a geographic information system and geocoding information with the compact code. The compact code can further be provided to other platforms (e.g. a delivery service platform) for use in identifying the position of a geographic location.

Example Applications of a Compact Code in a Geographic Information System

Figure 6:
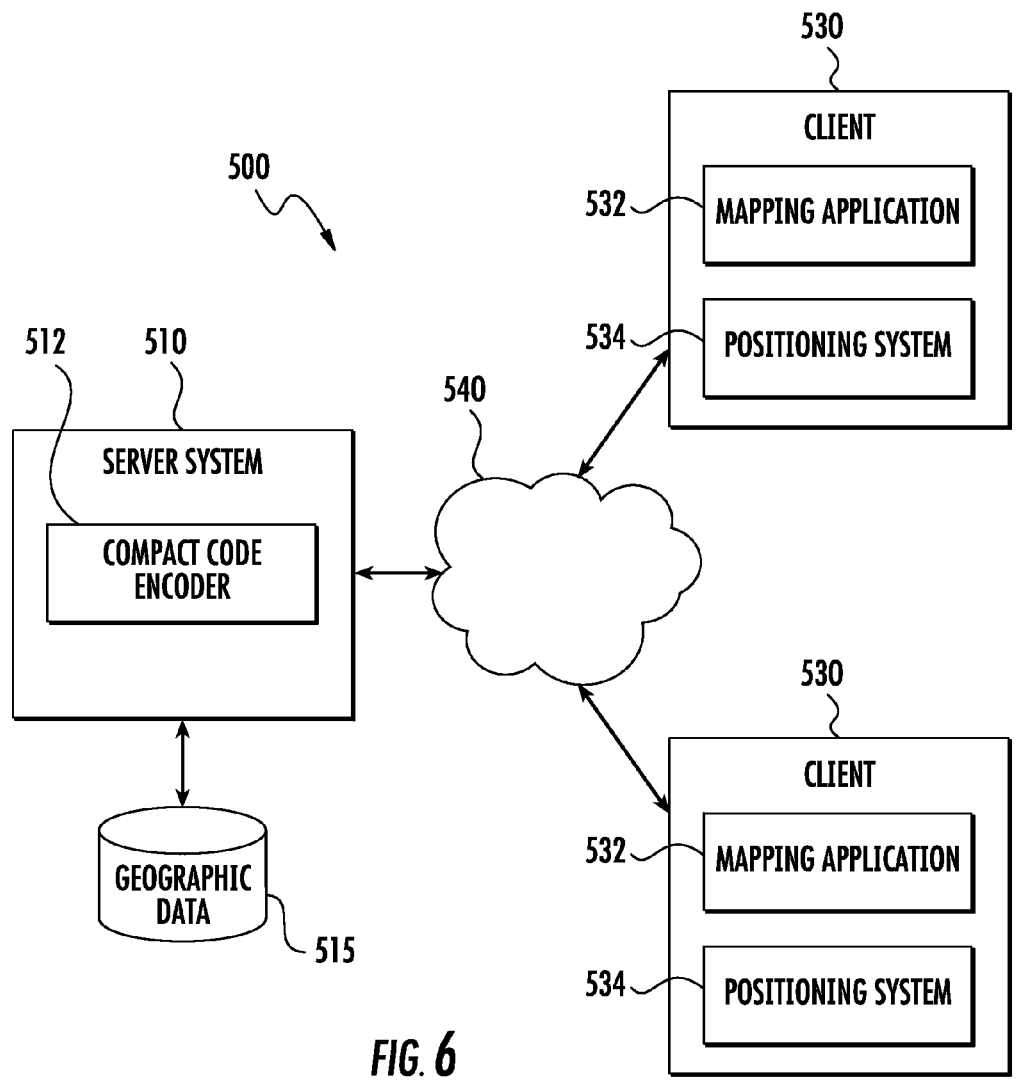
FIG. 6 depicts a geographic information system according to an embodiment of the present disclosure.

One example application of a compact code according to an embodiment of the present disclosure is to associate the compact code with a point of interest or other geographic information in a geographic information system. FIG. 6 depicts a geographic information system 500 according to an embodiment of the present disclosure. The geographic information system 500 can provide for the archiving, retrieving, and manipulation of geospatial data that has been indexed and stored according to geographic coordinates, such as latitude, longitude, and altitude coordinates, associated with the geospatial data. According to aspects of the present disclosure, the system 500 can index and store geospatial data and other information according to a compact code determined for or associated with the geospatial data.

The system 500 can combine satellite imagery, photographs, maps, three-dimensional models, vector data and other geographic data, and search capability so as to enable a user to view imagery of a geographic area and related geographic information (e.g., locales such as islands and cities; and points of interest such as local restaurants, hospitals, parks, hotels, and schools). The system 500 can further allow the user to conduct local searches and to get travel directions to a location or between two or more locations. Results can be displayed in a two-dimensional (2D), two-and-half dimensional (2.5D), or three-dimensional (3D) representation of the area of interest. The user can pan, tilt, zoom, and rotate the view to navigate a representation of the area of interest or the view can provide an animated tour around the area of interest.

The geographic information system 500 can include a client-server architecture, where the server system 510 communicates with one or more clients 530 via a network 540. The network 540 can include any suitable combination of wired or wireless networks, such as the Internet. Although two clients 530 are illustrated in FIG. 6, any number of clients 530 can be connected to the server system 510 over the network 540. While the present disclosure is discussed with reference to a client-server architecture, the inherent flexibility of computer-based systems allows for a great variety of possible configurations, combinations, and divisions of tasks and functionality between and among the components of the system 500. For instance, the systems and methods discussed herein can be implemented using a single computing device or across multiple computing devices operating sequentially or in parallel.

The server system 510 can include one or more computing devices that can include one or more processors and memory. The memory can store computer-readable instructions that when executed cause the one or more processors to perform operations. The server system 510 can include or can be in communication with one or more databases 515. The one or more databases 515 can store geospatial data to be served or provided to the client 530 over the network 540. The one or more databases 515 can include image data (e.g. digital maps, satellite images, aerial photographs, street level imagery, etc.), non-image data such as tabular data (e.g. digital yellow and white pages), and map layer data (e.g. databases of diners, restaurants, museums, and/or schools; databases of seismic activity; database of national monuments; etc.). The one or more databases 515 can store compact codes determined for points of interest and other geospatial data. Geospatial data can be stored in one or more databases 515 or in some other storage facility accessible to server system 510.

The server system 510 can be configured to receive requests for geographic information, and respond to those requests, via the network 540. In one embodiment, the server system 510 encodes the geographic information in one or more data files and provides the files to the requestor.

The server system 510 can implement a compact code encoder module 512. The compact code encoder module 512 can be configured to access a position coordinate associated with a geographic location from the one or more databases 515 or from a client device 530 over the network 540. The compact code encoder module 512 can determine a compact code for the geographic location from the position coordinate according to aspects of the present disclosure. The compact code can be associated with the geographic location in the geographic database 515. More particularly, information associated with the geographic location can be associated with the compact code.

The client 530 can include one or more computing devices, such as a desktop, laptop, personal digital assistant (PDA), smartphone, tablet, a navigation system, a handheld GPS system, a wearable computing device, a display coupled to one or more processors, or other suitable computing device. The client 530 can include one or more processors and memory. The memory can store computer-readable instructions that when executed cause the one or more processors to perform operations.

Note that other modules and components may be included in the system 400 and that illustrated system components may be rearranged. For instance, the one or more databases 425 can be integrated into the server system 410. Other configurations will be apparent in light of this disclosure, and the present disclosure is not intended to be limited to any particular one. Any number of modules can be programmed or otherwise configured to carry out the functionality described herein.

In one aspect, the client 530 can implement a mapping application 532 that allows a user to interact with the geographic information system 500. For instance, the mapping application 532 can allow a user to request maps or other geographic imagery, request travel directions, navigate geographic imagery, perform data searches and/or perform other functions. The mapping application 532 can implement or can be implemented in conjunction with an example user interface that presents and receives information from a user, such as a browser. According to particular aspects of the present disclosure, the mapping application 532 can display a compact code in conjunction with geographic information requested by a user. For instance, the mapping application 532 can be configured to display the compact code in conjunction with geographic imagery of a point of interest.

Figure 7:
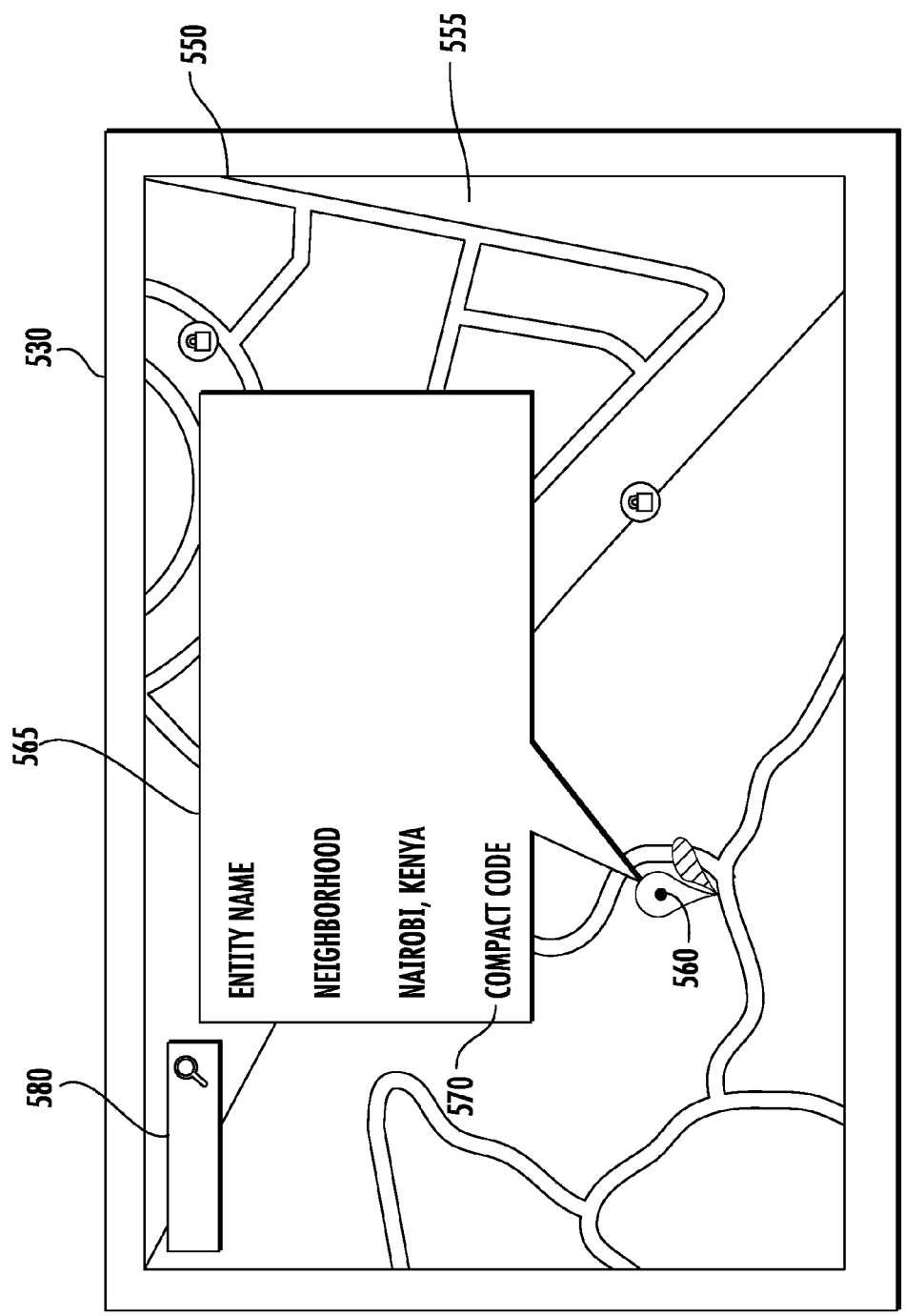
FIG. 7 depicts an example user interface presenting a compact code in a geographic information system according to an embodiment of the present disclosure.

FIG. 7 depicts an example user interface 550 of a mapping application implemented by a client device 530 in the geographic information system 500. The user interface 550 includes a viewport that displays geographic imagery 555 depicting a point of interest 560. The user interface 550 includes a bubble of information 565 about the point of interest 560. As illustrated, the bubble of information 565 can display the compact code 570 for the point of interest.

The user interface 550 depicted in FIG. 7 can further include a search tool 580. The search tool 580 can allow a user to search for particular points of interest in the geographic information system. The user interface 550 can display geographic imagery associated with a point of interest in response to the search. In one particular implementation, the user can input a compact code into the search tool 580. The user interface 550 can progressively zoom geographic imagery in response to the user inputting characters of the compact code. For example, the user interface 550 can progressively display different zoom levels of the geographic imagery 420 (e.g. the different zoom levels depicted in FIGS. 5(a)-5(f)) as the user inputs characters of the compact code into the search tool.

Referring back to FIG. 6, the client device 530 can further include a positioning system 534. The positioning system 534 can be any system, such as a GPS system, configured to determine the geographic position of the client device 530. The positioning system 534 can be used in conjunction with the mapping application 532 to navigate a user of the client device 530 to a particular compact code. For instance, a user can input or access a compact code of an intended destination (e.g. a delivery point). The mapping application 532 can decode the compact code to a geographic area. An example method of decoding a compact code will be discussed with reference to FIG. 8. The mapping application 532 can navigate the user to the specific location coordinate associated with the compact code using the positioning system 534. In particular, the mapping application 532 can provide travel directions to a user based on the user's current position relative to the location coordinate associated with the compact code.

The compact code can also be used for geolocating/geotagging information. For instance, a client device 530 can capture information (e.g. a photograph) and can determine a location coordinate for the information using the positioning system 534. The location coordinate can be used to determine a compact code for the information according to aspects of the present disclosure. In one example, the compact code for the information can be determined offline by the client device 530 (e.g. when the client device 530 is not connected to the server system 510 over the network 540). The compact code can be associated with the information to geolocate the information. The geolocated information can be communicated to the server system 510 for use in the geographic information system or to other computing devices for other applications.

Example Method for Decoding a Compact Code

Figure 8:
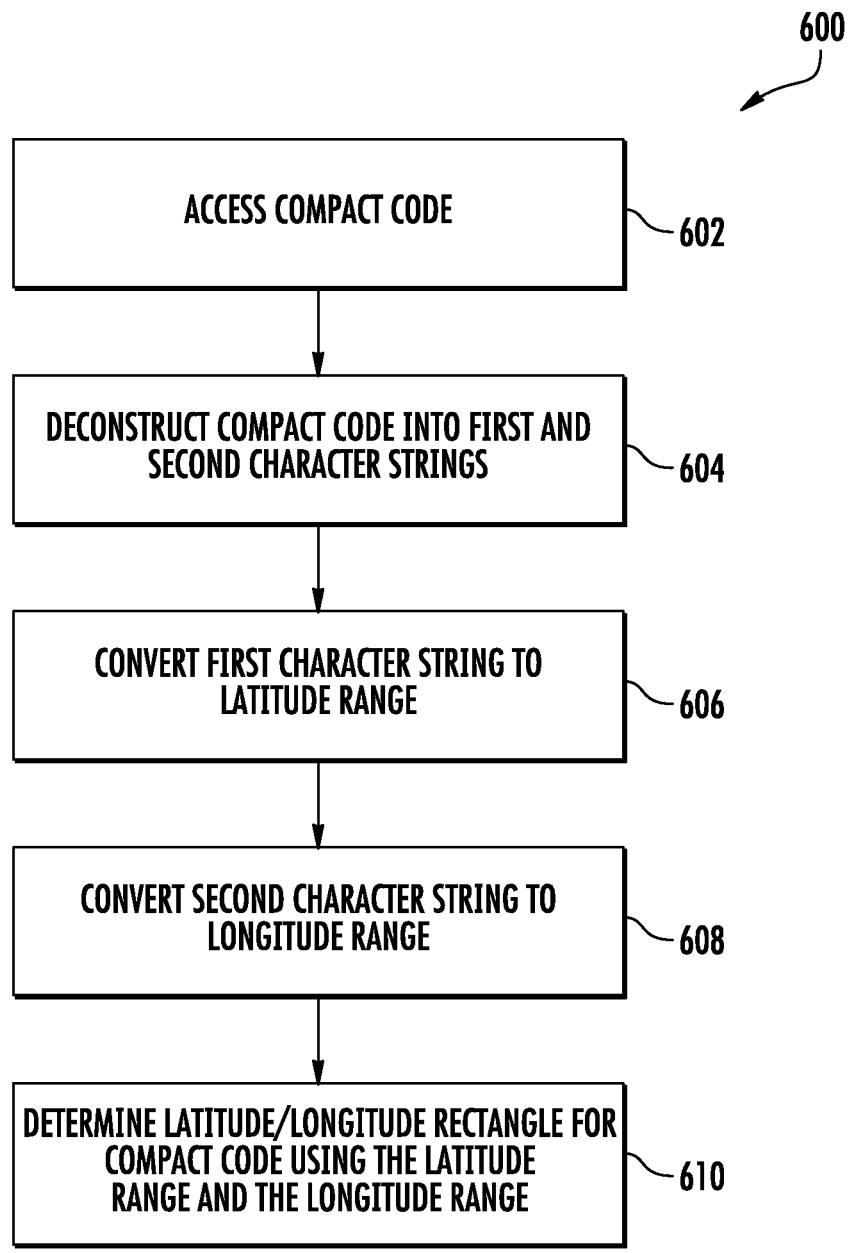
FIG. 8 depicts a flow diagram of an example method for decoding a compact code to determine a latitude/longitude rectangle associated with a latitude range and a longitude range.

FIG. 8 depicts an example method (600) for decoding a compact code into a geographic location (e.g. a latitude/longitude window) according to an embodiment of the present disclosure. The method (600) can be implemented by one or more computing devices, such as the one or more computing devices depicted in FIG. 9. In addition, FIG. 8 depicts steps performed in a particular order for purposes of illustration and discussion. Those of ordinary skill in the art, using the disclosures provided herein, will understand that various steps of any of the methods discussed herein can be omitted, rearranged, combined and/or adapted in various ways.

At (602), the method includes accessing a compact code. For instance, a compact code for a point of interest can be accessed by a mapping application implemented on a computing device. The compact code can be accessed from a memory or can be input by a user using a suitable user interface. In one implementation, the compact code can be received from a remote computing device associated with a geographic information system or other suitable platform (e.g. a delivery service platform).

At (604), the method includes deconstructing the compact code into a first character string and to a second character string. For instance, the characters in the compact code can be alternatingly placed into the respective first and second character strings. More particularly, the first character of the compact code can be associated with the first character string. The second character of the compact code can be associated with the second character string. The third character of the compact code can be associated with the first character string. The fourth character of the compact code can be associated with the second character string, and so forth. As an example, a compact code of 9FXD.BG can be deconstructed into a first character string of 9XB and a second character string of FDG.

At (606), the method includes converting the first character string to a latitude range. For instance, the characters in the first character string can be decoded with the character set used to determine the compact code and can be converted to a base 10 number base to determine a latitude coordinate. The latitude coordinate can be converted from a positive number range to a standard latitude coordinate by subtracting 90° from the latitude coordinate. The latitude coordinate can serve as the lower bound of the latitude range. An accuracy can be determined based at least in part on the number of characters in the first character string. The accuracy can be added to the latitude coordinate to determine the upper bound of the latitude range.

In the embodiment where a base 20 conversion is used to generate the compact code, a decoded value can be set to zero. The first character can be removed from the first character string. A zero-index position (e.g. 0 to 19) can be determined for the character. The position of the character can be multiplied by a multiplier which is initialized as 20. The obtained value can be added to the decoded value. The multiplier can then be divided by 20. This process can be repeated for each character in the first character string. The decoded value can be converted to a latitude coordinate by subtracting 90° from the decoded value. The accuracy can then be determined by the multiplier. The latitude coordinate can serve as the lower bound of the latitude range. The accuracy can be added to the latitude coordinate to determine the upper bound for the latitude range.

As an example, the first character string 9XB can be decoded as follows. The multiplier is set to 20 and the decoded value is set to 0. The first character is "9," which has a position 6 in the character set used to encode the latitude coordinate (See FIG. 3). 20*6 can be added to the initial decoded value of 0 to obtain 120. The multiplier can be divided by 20 to obtain 1. The second character in the string is "X," which has a position 17 in the character set (X is 17 from 0 in the character set of FIG. 3). 1*17 can be added to the decoded value to obtain 137. The multiplier can be divided by 20 to obtain 0.05. The third character in the string is "B," which has a position 7 in the character set (see FIG. 3). 0.05*7 is added to the decoded value to obtain 137.35. 90 is subtracted from the decoded value to obtain a latitude coordinate of 47.35°. The accuracy is determined as the multiplier =0.05. The accuracy can be added to the base latitude coordinate to obtain a latitude range of 47.35° to 47.40°.

At (608) of FIG. 8, the method includes converting the second character string to a longitude range. For instance, the characters in the second character string can be decoded with the character set used in determining the compact code and can be converted to a base 10 number to determine a longitude coordinate. The longitude coordinate can be converted from a positive number range to a standard longitude coordinate by subtracting 180° from the longitude coordinate. The longitude coordinate can serve as the lower bound of the longitude range. An accuracy can be determined based at least in part on the number of characters in the second character string. The accuracy can be added to the longitude coordinate to determine the upper bound of the longitude range.

In the embodiment where a base 20 conversion is used to generate the compact code, a decoded value can be set to zero. The first character can be removed from the second character string. A zero-index position (e.g. 0 to 19) can be determined for the character. The position of the character can be multiplied by a multiplier which is initialized as 20. The obtained value can be added to the decoded value. The multiplier can then be divided by 20. This process can be repeated for each character in the second character string. The decoded value can be converted to a longitude coordinate by subtracting 180° from the decoded value. The accuracy can then be determined by the multiplier. The longitude coordinate can serve as the lower bound of the longitude range. The accuracy can be added to the longitude coordinate to determine the upper bound for the longitude range.

As an example, the second character string FDG can be decoded as follows. The multiplier is set to 20 and the decoded value is set to 0. The first character is "F," which has a position 9 in the character set used to encode the longitude coordinate (See FIG. 3). 20*9 can be added to the initial decoded value of 0 to obtain 180. The multiplier can be divided by 20 to obtain 1. The second character in the string is "D," which has a position 8 in the character set (see FIG. 3). 1*8 can be added to the decoded value to obtain 188. The multiplier can be divided by 20 to obtain 0.05. The third character in the string is "G," which has a position 10 in the character set (see FIG. 3). 0.05*10 is added to the decoded value to obtain 188.5. 180 is subtracted from the decoded value to obtain a base longitude coordinate of 8.5°. The accuracy is determined as the multiplier =0.05. The accuracy can be added to the longitude coordinate to obtain a longitude range of 8.50° to 8.55°.

At (610), the geographic position can be determined from the latitude range and the longitude range. For instance, a latitude/longitude rectangle can be determined for the compact code. In the example of a compact code of 9FXD.BG, the latitude/longitude rectangle can be associated with a latitude range of 47.35° to 47.40° and a longitude range of 8.50° to 8.55°.

Example Computer-Based System for Providing a Compact Code

Figure 9:
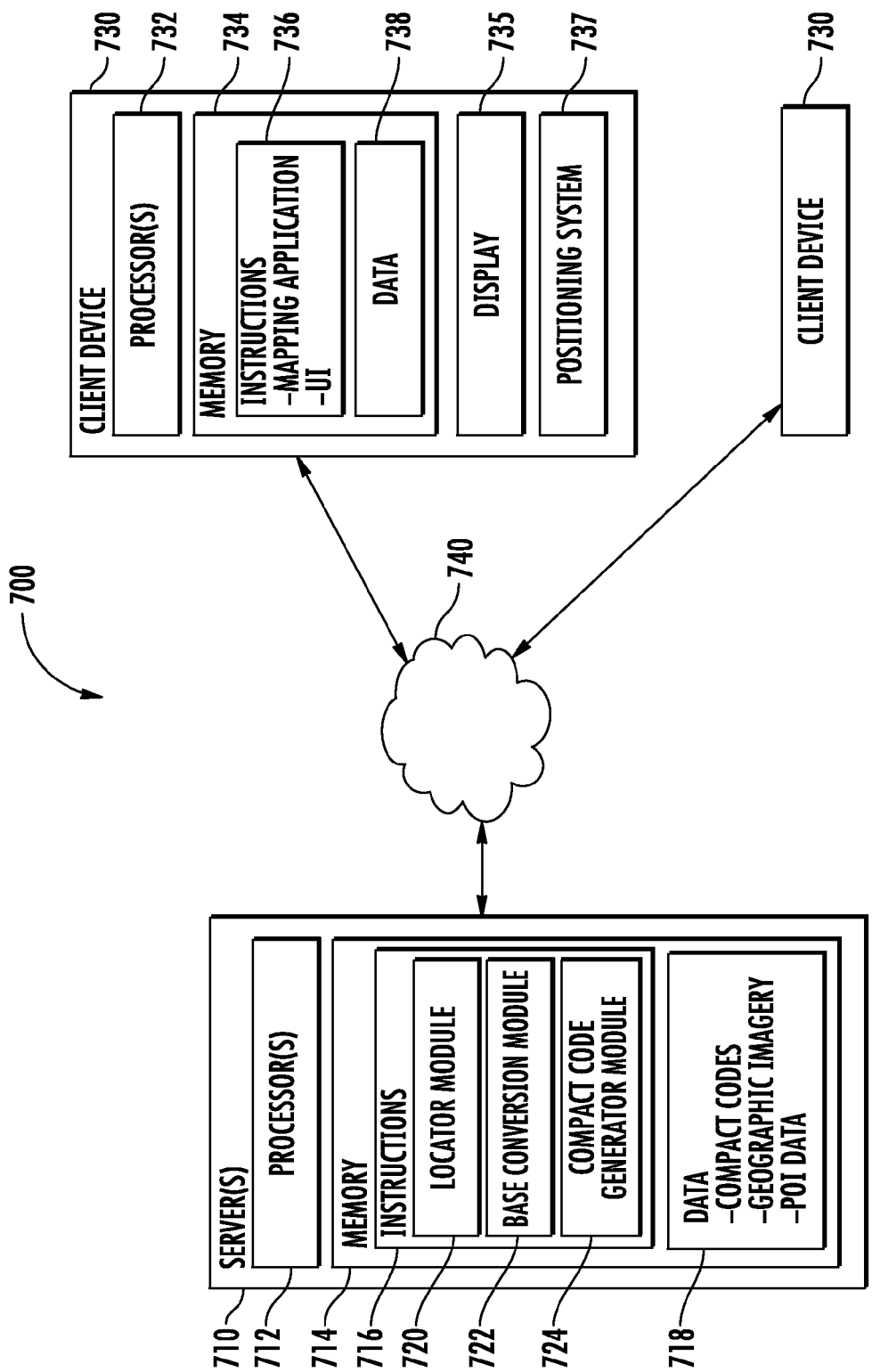
FIG. 9 depicts a computing system for providing a compact code according to an embodiment of the present disclosure.

FIG. 9 depicts a computing system 700 that can be used to implement the methods and systems according to example aspects of the present disclosure. The system 700 can be implemented using a client-server architecture that includes a server 710 that communicates with one or more client devices 730 over a network 740. The system 700 can be implemented using other suitable architectures, such as a single computing device.

The system 700 includes a server 710, such as a web server. The server 710 can host a geographic information system. The server 710 can be implemented using any suitable computing device(s). The server 710 can have one or more processors 712 and a memory 714. The server 710 can also include a network interface used to communicate with one or more client devices 730 over a network 740. The network interface can include any suitable components for interfacing with one more networks, including for example, transmitters, receivers, ports, controllers, antennas, or other suitable components.

The one or more processors 712 can include any suitable processing device, such as a microprocessor, microcontroller, integrated circuit, or other suitable processing device. The memory 714 can include any suitable computer-readable medium or media, including, but not limited to, non-transitory computer-readable media, RAM, ROM, hard drives, flash drives, or other memory devices. The memory 714 can store information accessible by the one or more processors 712, including instructions 716 that can be executed by the one or more processors 712. The instructions 716 can be any set of instructions that when executed by the one or more processors 712, cause the one or more processors 712 to provide desired functionality. For instance, the instructions 716 can be executed by the one or more processors 712 to implement a locator module 720, a base conversion module 722, and a compact code generator module 724.

The locator module 720 can be configured to access a position coordinate for a geographic location. The position coordinate can include a latitude coordinate and a longitude coordinate. The base conversion module 722 can be configured to convert the latitude coordinate to a first character string using a base conversion and to convert the longitude coordinate to a second character string using the base conversion. In a particular implementation, the base conversion module 722 can be configured to convert the latitude coordinate and the longitude coordinate into first and second character strings using a disambiguated character set. The compact code generator module 724 can be configured to generate a compact code by interleaving the first character string and the second character string.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Memory 714 can also include data 718 that can be retrieved, manipulated, created, or stored by the one or more processors 712. The data 718 can include geographic data such as compact codes, geographic imagery, point of interest data and other data. The data 718 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more client devices 730 over the network 740. Although two client devices 730 are illustrated in FIG. 9, any number of client devices 730 can be connected to the server 710 over the network 740. The client devices 730 can be any suitable type of computing device, such as a general purpose computer, special purpose computer, laptop, desktop, mobile device, smartphone, tablet, wearable computing device, a display with one or more processors, or other suitable computing device.

Similar to the server 710, a client device 730 can include one or more processor(s) 732 and a memory 734. The one or more processor(s) 732 can include one or more central processing units (CPUs), graphics processing units (GPUs) dedicated to efficiently rendering images, and or other processing devices. The memory 734 can store information accessible by the one or more processors 732, including instructions 736 that can be executed by the one or more processors 732 and data 738. For instance, the memory 734 can store instructions 736 for implementing a user interface and a mapping application for a geographic information system The client device 730 can include various input/output devices for providing and receiving information from a user, such as a touch screen, touch pad, data entry keys, speakers, and/or a microphone suitable for voice recognition. For instance, the client device 730 can have a display 735 for presenting geographic imagery of a geographic area to a user.

The client device 730 can further include a positioning system 737. The positioning system 737 can be any device or circuitry for determining the position of a client device 730. For example, the positioning device 737 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 730 can also include a network interface used to communicate with one or more remote computing devices (e.g. server 710) over the network 740. The network interface can include any suitable components for interfacing with one more networks, including for example, transmitters, receivers, ports, controllers, antennas, or other suitable components.

The network 740 can be any type of communications network, such as a local area network (e.g. intranet), wide area network (e.g. Internet), or some combination thereof The network 740 can also include a direct connection between a client device 730 and the server 710. In general, communication between the server 710 and a client device 730 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining a compact code for a geographic location, the method comprising:

accessing, by one or more computing devices, a position coordinate for a geographic location, the position coordinate comprising a latitude coordinate and a longitude coordinate;

converting, by the one or more computing devices, the latitude coordinate to a first character string using a base conversion, the first character string having fewer characters than the latitude coordinate;

converting, by the one or more computing devices, the longitude coordinate to a second character string using the base conversion, the second character string having fewer characters than the longitude coordinate; and interleaving, by the one or more computing devices, the first character string and the second character string to generate a compact code for the geographic location such that characters from the first character string alternate with characters from the second character string in the compact code;

wherein the method further comprises receiving, by the one or more computing devices, a user input specifying the compact code; and progressively zooming, by the one or more computing devices, geographic imagery associated with the compact code as one or more characters of the compact code are input into the geographic information system.

2. The computer-implemented method of claim 1, wherein the base conversion is a base 20 conversion.

3. The computer-implemented method of claim 1, wherein the base conversion encodes the latitude coordinate into the first character string and the longitude coordinate into the second character string using a predefined character set.

4. The computer-implemented method of claim 1, wherein the predefined character set is a disambiguated character set.

5. The computer-implemented method of claim 4, wherein the disambiguated character set does not include vowel characters.

6. The computer-implemented method of claim 4, wherein the disambiguated character set includes the characters "2", "3", "5", "6", "7", "8", "9", "B", "D", "F", "G", "H", "J", "M", "P", "Q", "W", "X", "Y", "Z".

7. The computer-implemented method of claim 1, wherein interleaving, by the one or more computing devices, the first character string and the second character string to generate a compact code for the geographic location comprises alternating characters from the first character string and the second character string in the compact code.

8. The computer-implemented method of claim 7, wherein the compact code has a first character associated with the first character string generated from the latitude coordinate.

9. The computer-implemented method of claim 1, wherein the method comprises converting, by the one or more computing devices, the latitude coordinate to a positive latitude range and converting, by the one or more computing devices, the longitude coordinate to a positive longitude range.

10. The computer-implemented method of claim 1, Wherein the method comprises associating, by the one or more computing devices, the compact code with a point of interest in a geographic information system.

11. The computer-implemented method of claim 1, wherein the method comprises displaying the compact code in conjunction with geographic imagery depicting the geographic location.

12. The computer-implemented method of claim 1, wherein the method comprises geolocating information in a geographic information system using the compact code.

13. The computer-implemented method of claim 1, wherein the method comprises providing travel directions to the geographic location using the compact code.

14. The computer-implemented method of claim 13, wherein providing travel directions to the geographic location using the compact code comprises:
   decoding the compact code into a latitude range and a longitude range; and
   providing travel directions to the geographic location using the latitude range and the longitude range.

15. A tangible, non-transitory computer-readable medium storing computer readable instructions that when executed by one or more processors are configured to cause the one or more processors to perform operations, the operations comprising:
   accessing a position coordinate for a geographic location, the position coordinate comprising a latitude coordinate and a longitude coordinate;
   converting the latitude coordinate to a first character string using a base conversion, the first character string having fewer characters than the latitude coordinate;
   converting the longitude coordinate to a second character string using the base conversion, the second character string having fewer characters than the longitude coordinate; and
   interleaving the first character string and the second character string to generate a compact code for the geographic location such that characters from the first character string alternate with characters from the second character string in the compact code;
   wherein the operations further comprise receiving a user input specifying the compact code; and progressively zooming geographic imagery associated with the compact code as one or more characters of the compact code are input into the geographic information system.

16. The tangible, non-transitory computer-readable medium of claim 15, wherein the operations further comprise decoding the compact code into a latitude range and a longitude range.

17. A computer-implemented method, comprising:
   presenting, by one or more computing devices, a user interface for displaying geographic imagery;
   receiving, by the one or more computing devices, a user input specifying a compact code associated with a geographic area; and
   progressively zooming geographic imagery associated with the compact code as one or more characters of the compact code are input into the geographic information system;
   wherein the compact code is generated for the geographic area by converting a latitude coordinate associated with a geographic area to a first character string using a base conversion, the first character string having fewer characters than the latitude coordinate; converting a longitude coordinate associated with the geographic area to a second character string using the base conversion, the second character string having fewer characters than the longitude coordinate; and interleaving the first character string and the second character string to generate the compact code such that characters from the first character string alternate with characters from the second character string in the compact code.

* * * * *